US012607273B2

(12) United States Patent
Kumatabara et al.

(10) Patent No.: US 12,607,273 B2
(45) Date of Patent: Apr. 21, 2026

(54) SUCK-BACK VALVE

(71) Applicant: ASAHI YUKIZAI CORPORATION, Nobeoka (JP)

(72) Inventors: Yusuke Kumatabara, Nobeoka (JP); Kenro Yoshino, Nobeoka (JP)

(73) Assignee: ASAHI YUKIZAI CORPORATION, Nobeoka (JP)

( * ) Notice: Subject to any disclaimer, the term of this patent is extended or adjusted under 35 U.S.C. 154(b) by 103 days.

(21) Appl. No.: 18/578,150

(22) PCT Filed: Jul. 11, 2022

(86) PCT No.: PCT/JP2022/027277
§ 371 (c)(1),
(2) Date: Jan. 10, 2024

(87) PCT Pub. No.: WO2023/286739
PCT Pub. Date: Jan. 19, 2023

(65) Prior Publication Data
US 2024/0337324 A1      Oct. 10, 2024

(30) Foreign Application Priority Data

Jul. 12, 2021    (JP) ................................. 2021-114766

(51) Int. Cl.
*F16K 23/00*          (2006.01)
*F16K 7/12*           (2006.01)
(52) U.S. Cl.
CPC ................ *F16K 23/00* (2013.01); *F16K 7/12* (2013.01)
(58) Field of Classification Search
CPC ........ F16K 23/00; F16K 7/12; F16K 31/1221; F16K 31/1245; B05C 11/10
See application file for complete search history.

(56) References Cited

U.S. PATENT DOCUMENTS 5,402,816 A * 4/1995 Migliori ................ F15B 11/028
                                                    137/115.02
5,927,605 A    7/1999 Odajima et al.
(Continued)

FOREIGN PATENT DOCUMENTS

JP        H03-115267 U      11/1991
JP        H08-010399 Y2      3/1996
(Continued)

OTHER PUBLICATIONS

PCT/ISA/210, "International Search Report for PCT International Application No. PCT/JP2022/027277," Aug. 9, 2022.

*Primary Examiner* — Craig M Schneider
*Assistant Examiner* — Andrew J Rost
(74) *Attorney, Agent, or Firm* — HAUPTMAN HAM, LLP

(57)          ABSTRACT

A suck-back valve includes a valve main body formed with a suck-back chamber, and a suck-back mechanism unit. The suck-back mechanism unit includes a suck-back piston accommodated in a suck-back cylinder chamber and being slidable between two dead center positions, and a biasing member biasing the suck-back piston in a direction to increase the volume of the suck-back chamber. The suck-back cylinder chamber is divided by the suck-back piston into a first fluid chamber and a second fluid chamber. The biasing member is arranged in the first fluid chamber, and a standby position at which the suck-back piston is positioned when the pressure of a drive fluid in the second fluid chamber becomes the maximum is set to be away from the dead center position on the side closer to the suck-back chamber.

12 Claims, 4 Drawing Sheets

(56)                    References Cited

U.S. PATENT DOCUMENTS

| | | | |
|---|---|---|---|
| 5,931,384 A | | 8/1999 | Fukano et al. |
| 5,938,119 A * | | 8/1999 | Yamada .................. F16K 23/00 |
| | | | 251/63.5 |
| 5,950,923 A * | | 9/1999 | Fukano ..................... B05B 1/28 |
| | | | 251/30.02 |
| 5,950,924 A | | 9/1999 | Hatakeyama et al. |
| 5,988,524 A * | | 11/1999 | Odajima ................. F16K 23/00 |
| | | | 251/63.5 |
| 6,000,629 A * | | 12/1999 | Tamura ................... F16K 23/00 |
| | | | 137/340 |
| 6,029,903 A * | | 2/2000 | Fukano ................... F16K 23/00 |
| | | | 251/30.02 |
| 6,062,442 A * | | 5/2000 | Yang ................. H01L 21/67017 |
| | | | 118/52 |
| 6,082,629 A * | | 7/2000 | Lee .......................... F16K 23/00 |
| | | | 137/467.5 |
| 6,176,438 B1 * | | 1/2001 | Sato .................... B05C 11/1026 |
| | | | 251/30.02 |
| 6,332,924 B1 * | | 12/2001 | Shim ....................... F16K 23/00 |
| | | | 118/52 |
| 2003/0178504 A1 * | | 9/2003 | Fukano .............. B05C 11/1026 |
| | | | 239/119 |

FOREIGN PATENT DOCUMENTS

| | | |
|---|---|---|
| JP | H10-252919 A | 9/1998 |
| JP | H10-281335 A | 10/1998 |
| JP | H11-037327 A | 2/1999 |

* cited by examiner

SUCK-BACK VALVE

RELATED APPLICATIONS

The present application is National Phase of International Application No. PCT/JP2022/027277 filed Jul. 11, 2022, and claims priority from Japanese Application No. 2021-114766, filed Jul. 12, 2021, the disclosure of which is hereby incorporated by reference herein in its entirety.

TECHNICAL FIELD

The present invention relates to a suck-back valve which is used, for example, in a process of supplying a liquid such as a chemical solution to a semiconductor wafer in a semiconductor manufacturing apparatus, and sucks back the liquid after stopping the flow of the liquid to prevent the liquid from dripping out of the end of a pipe.

BACKGROUND ART

For example, in a pipe or the like for supplying a liquid such as a chemical solution to a semiconductor wafer in a semiconductor manufacturing apparatus, a suck-back valve which sucks back the liquid in the pipe is used to prevent the liquid from dripping out of the end portion of the pipe after the supply of the liquid is stopped. As the suck-back valve, there is generally one having a mechanism which can supply and discharge a drive fluid to and from a cylinder chamber accommodating a piston to move the piston, and increase or decrease a volume of a suck-back chamber being in communication with a pipe by elastic deformation of a diaphragm interlocking with the piston to suck back the liquid in the pipe (see, for example, PTL1). Such a suck-back valve is arranged downstream of an opening/closing valve for opening and closing a fluid passage in the pipe. Further, as described in PTL2 and PTL3, there is also known a suck-back valve integrally provided with an opening/closing valve unit for performing the opening/closing of a fluid passage and a suck-back mechanism unit for sucking back liquid in the fluid passage.

CITATION LIST

Patent Literatures

PDL1: Japanese Examined Utility Model Publication No. H08-010399

PDL2: Japanese Unexamined Utility Model Publication No. H3-115267

PDL3: Japanese Unexamined Patent Publication No. H11-37327

SUMMARY OF THE INVENTION

Technical Problem

When the opening/closing valve and the suck-back valve are controlled in operation individually, matching of the timing of closing off the flow of the liquid by the opening/closing valve with the timing of sucking back the liquid by the suck-back valve is difficult, and the control becomes complicated. For this reason, in many cases, the pipes branched from one common switching valve for switching between the supply and discharge of the drive fluid are connected to the opening/closing valve unit and the suck-back mechanism unit, and the operations of the opening/ closing valve unit and the suck-back mechanism unit are controlled by the operation of one switching valve.

When the opening/closing valve unit and the suck-back mechanism unit are operated by the operation of one switching valve, for example, the suck-back valve may have a configuration in which the suck-back valve is provided with a valve main body, an opening/closing valve unit, and a suck-back mechanism unit, and the valve main body is formed with a fluid passage including an inlet flow passage and an outlet flow passage, a valve chamber to which the inlet flow passage opens, and a suck-back chamber located between the valve chamber and the outlet flow passage.

In the opening/closing valve unit, there is a piston which is moved by supplying and discharging a drive fluid to and from the cylinder chamber accommodating the piston to thereby bring a valve element interlocking with the piston into contact with and away from a valve seat formed around an opening from the inlet flow passage in the valve chamber. There is arranged in the cylinder chamber a biasing spring which biases the piston in a direction to press the valve element against the valve seat. In the opening/closing valve unit having such a configuration, the drive fluid is supplied to the cylinder chamber to cause a force due to the pressure of the drive fluid in the cylinder chamber to move the piston against a biasing force of the biasing spring, thereby separating the valve element from the valve seat. Further, by discharging the drive fluid from the cylinder chamber, the biasing force of the biasing spring exceeds the force due to the pressure of the drive fluid in the cylinder chamber and moves the piston in the direction to bring the valve element closer to the valve seat, thereby pressing the valve element against the valve seat. The opening and closing of the fluid passage are performed in this way.

In the suck-back mechanism unit, there is a piston which is moved by supplying and discharging the drive fluid to and from the cylinder chamber accommodating the piston to thereby deform a diaphragm facing the suck-back chamber in conjunction with the piston and increase or decrease the volume of the suck-back chamber. There is arranged in the cylinder chamber a biasing spring which biases the piston in the direction to separate from the suck-back chamber. In the suck-back mechanism unit configured in this way, by supplying the drive fluid to the cylinder chamber, the force due to the pressure of the drive fluid in the cylinder chamber moves the piston against the biasing force of the biasing spring to expand the diaphragm toward the suck-back chamber. Further, by discharging the drive fluid from the cylinder chamber, the biasing force of the biasing spring exceeds the force due to the pressure of the drive fluid in the cylinder chamber and moves the piston in the direction to retract the diaphragm from the suck-back chamber, thereby returning the diaphragm to its original shape. The increase or decrease in the volume of the suck-back chamber associated with such deformation of the diaphragm causes the liquid in the fluid passage (specifically, the outlet flow passage) to be sucked back.

In the suck-back valve having such a configuration, when the drive fluid is supplied from the switching valve to the cylinder chambers of the opening/closing valve unit and the suck-back mechanism unit, the valve element is separated from the valve seat by the opening/closing valve unit, so that the flow of the liquid in the fluid passage is started and the diaphragm expands into the suck-back chamber by the suck-back mechanism unit and enters a standby state. On the other hand, when the drive fluid in the cylinder chambers of the opening/closing valve unit and the suck-back mechanism unit is discharged through the switching valve, the valve element is pressed against the valve seat by the opening/ closing valve unit to close off the flow of the liquid in the fluid passage and the diaphragm is retracted from the suck-back chamber by the suck-back mechanism unit to increase the volume of the suck-back chamber, so that the liquid in the fluid passage (specifically, the outlet flow passage) is sucked back.

When the opening/closing valve unit is closed from a state in which the liquid flows in the fluid passage, the liquid moves in the fluid passage due to inertia, so that a part of the liquid separated from the liquid in the outlet flow passage leaks out from a nozzle being in communication with the outlet flow passage. Therefore, it is necessary to suck back the liquid by the suck-back mechanism unit as soon as possible after closing by the opening/closing valve unit. Further, when sucking back is performed rapidly after closing by the opening/closing valve unit, the liquid remaining by adherence to an inner peripheral surface of the nozzle connected to the outlet flow passage may gather together and drip out of the nozzle after sucking back. In order to prevent such dripping, sucking back is preferably performed gently. One of methods for performing sucking back gently is to reduce the discharge flow rate of the drive fluid from the cylinder chamber of the suck-back mechanism unit. On the other hand, in the suck-back mechanism unit, in order to start the movement of the piston being stationary in the cylinder chamber for a suck-back operation and perform the suck-back operation, it is necessary that the drive fluid is discharged from the cylinder chamber to reduce the pressure of the drive fluid, and that the difference between the force due to the pressure of the drive fluid acting on the piston and the biasing force of the biasing spring is overcoming the static friction. When the discharge flow rate of the drive fluid from the cylinder chamber of the suck-back mechanism unit is reduced, the reduction in the pressure of the drive fluid in the cylinder chamber becomes gradual. Therefore, a problem arises in that the time required for the difference between the two forces acting on the piston to overcome the static friction becomes long, and the start of the suck-back operation is delayed.

Accordingly, it is an object of the present invention to solve the problems existing in the prior art and to provide a suck-back valve, switching between the opening and closing of a fluid passage and between the supply and discharge of a drive fluid for a suck-back operation by a common switching valve, in which the suck-back operation is allowed to be gently performed while the suck-back operation being performed quickly after closing the fluid passage.

Solution to Problem

In view of the above-described object, the present invention provides a suck-back valve including: a valve main body formed with a fluid flow passage for a fluid to flow therethrough, including an inlet flow passage and an outlet flow passage, and a suck-back chamber being in communication with the outlet flow passage; and a suck-back mechanism unit, used to suck back the fluid from the outlet flow passage by increasing the volume of the suck-back chamber, in which the suck-back mechanism unit includes a suck-back drive unit housing having a suck-back cylinder chamber formed therein, a suck-back piston accommodated in the suck-back cylinder chamber and being slidable along an inner peripheral surface of the suck-back cylinder chamber between a first dead center position, which is a limit of movement on the side closer to the suck-back chamber, and a second dead center position, which is a limit of movement on the far side from the suck-back chamber, and a suck-back biasing member biasing the suck-back piston in a direction to increase the volume of the suck-back chamber, the suck-back cylinder chamber divided by the suck-back piston into a first fluid chamber and a second fluid chamber, the suck-back biasing member arranged in the first fluid chamber so that the suck-back piston can be moved, by supplying a drive fluid to the second fluid chamber to increase the volume of the second fluid chamber against a biasing force of the suck-back biasing member, from a suck-back position at which the suck-back piston is positioned when the increase in the volume of the suck-back chamber is completed, to a standby position at which the suck-back piston is positioned when pressure of the drive fluid in the second fluid chamber becomes the maximum, the standby position set to be away from the first dead center position.

In the above-described suck-back valve, the standby position of the suck-back piston of the suck-back mechanism unit, i.e., the position of the suck-back piston when the pressure of the drive fluid in the second fluid chamber is maximized is set to be away from the first dead center position which is the limit of movement of the suck-back piston on the side closer to the suck-back chamber. Here, a dead center position means a movement limit position where movement is restricted not by the biasing force of the biasing member but by physical contact of the piston which abuts against a stepped portion or wall or the like of another structure. When the suck-back piston is positioned at the first dead center position, the suck-back piston abuts against the stepped portion or wall or the like of another structure and is restricted from moving in the direction to approach the suck-back chamber. Therefore, the force acting on the suck-back piston due to the pressure of the drive fluid in the second fluid chamber (hereinafter may be described as "the force due to the drive fluid") is larger than the force acting on the suck-back piston by the suck-back biasing member (hereinafter may be described as "the force by the suck-back biasing member"). In order for the suck-back piston to start moving in the direction to separate from the first dead center position, it is necessary that the drive fluid in the second fluid chamber is discharged to reduce the pressure, and the force due to the drive fluid is first reduced until it becomes equal to the force by the suck-back biasing member and thereafter further reduced by an amount exceeding the static friction between the suck-back piston and the inner peripheral surface of the suck-back cylinder chamber. However, in the above-described suck-back valve, the suck-back piston at the standby position does not abut against the stepped portion or the bottom portion of the suck-back cylinder chamber in the moving direction thereof, and is not restricted from moving by physical contact. Thus, the force applied to the suck-back piston in the direction toward the suck-back chamber by the pressure of the drive fluid in the second fluid chamber, and the force in the direction to separate from the suck-back chamber, which is applied to the suck-back piston by the suck-back biasing member in the first fluid chamber, are brought into a balanced state. Therefore, in order for the suck-back piston to start moving in the direction to separate from the first dead center position, the drive fluid in the second fluid chamber is discharged to reduce the pressure, and the force due to the drive fluid needs only to be reduced by an amount exceeding the static friction between the suck-back piston and the inner peripheral surface of the cylinder chamber from the state of the standby position at which the force is equal to the force by the suck-back biasing member. It is thus possible to start the suck-back operation with a small discharge amount of drive fluid.

In one embodiment of the above suck-back valve, the suck-back mechanism unit may further include a diaphragm having an outer peripheral edge sandwiched between the suck-back drive unit housing and the valve main body, and a suck-back stem extending from the suck-back piston and inserted through a through hole formed in a bottom portion of the suck-back cylinder chamber, the diaphragm partitioning the suck-back drive unit housing and the suck-back chamber from each other, the diaphragm connected to a tip end of the suck-back stem so that the volume of the suck-back chamber is increased or decreased by deformation of the diaphragm accompanying movement of the suck-back piston.

Preferably, in the above-described suck-back valve, there is a seal member attached to an outer peripheral surface of the suck-back piston so as to seal between the suck-back piston and the inner peripheral surface of the suck-back cylinder chamber, and there is no seal member provided between an inner peripheral surface of the through hole and an outer peripheral surface of the suck-back stem. The frictional force between a movable member such as the suck-back piston or the suck-back stem and an inner peripheral surface of a stationary member such as the suck-back cylinder chamber is greatly affected by the friction between the seal member attached to an outer peripheral portion of the movable member and the stationary member. If the number of seal members is reduced as in the above configuration, it is possible to reduce the static frictional force between an outer peripheral surface of the movable member such as the suck-back piston or the suck-back stem and the inner peripheral surface of the stationary member such as the cylinder chamber. As a result, the suck-back operation can be started with a smaller discharge amount of drive fluid.

The seal member is preferably a lip packing such as a U packing, a V packing, a Y packing, an L packing, a J packing, or the like. Compared to an O-ring or the like, the lip packing can reduce seal pressure, thereby also reducing the static frictional force between the movable member such as the suck-back piston and the stationary member such as the cylinder chamber.

In one embodiment, it is preferable that the above-described suck-back valve further includes an opening/closing valve unit connected to a common switching valve from which the suck-back mechanism branches, the common switching valve switching the supply and discharge of the working fluid, in which the valve main body is provided with a valve chamber which is in communication with the inlet flow passage and is in communication with the suck-back chamber via a communication passage, the valve chamber having a valve seat which a valve element is brought into contact with and away from, the valve seat formed in a peripheral edge of an opening from the inlet flow passage or the communication passage to the valve chamber, and in which the opening/closing valve unit includes an opening/closing drive unit housing having a opening/closing cylinder chamber formed therein, an opening/closing piston accommodated in the opening/closing cylinder chamber and being slidable along an inner peripheral surface of the opening/closing cylinder chamber, an opening/closing stem extending from the opening/closing piston so as to penetrate a bottom portion of the opening/closing cylinder chamber and protrude into the valve chamber, and an opening/closing biasing member biasing the opening/closing piston in a direction to cause the valve element connected to a tip end of the opening/closing stem to approach the valve seat, and the volume of the suck-back cylinder chamber is larger than the volume of the opening/closing cylinder chamber. For example, the diameter of the suck-back cylinder chamber may be larger than the diameter of the opening/closing cylinder chamber. When the volume of the suck-back cylinder chamber is increased, the volume of the second fluid chamber at the time that the suck-back piston is at the standby position is also increased, and the rate of change in volume is lowered with respect to the same discharge flow rate of drive fluid. As a result, the moving speed of the suck-back piston with respect to the same discharge flow rate of drive fluid can be reduced, thereby performing the suck-back operation more gently.

Preferably, the opening/closing cylinder chamber is divided by the opening/closing piston into a third fluid chamber and a fourth fluid chamber, and the opening/closing biasing member is arranged in the fourth fluid chamber so that the opening/closing piston can be moved, by supplying the drive fluid to the third fluid chamber through the switching valve to increase the volume of the third fluid chamber against a biasing force of the opening/closing biasing member, from a valve closing position at which the valve element is seated on the valve seat to a valve opening position at which the opening/closing piston is positioned when the pressure of the drive fluid in the third fluid chamber becomes the maximum, the suck-back biasing member and the opening/closing biasing member configured so that the pressure of the drive fluid in the second fluid chamber when the suck-back piston is positioned at the suck-back position is lower than the pressure of the drive fluid in the third fluid chamber when the opening/closing piston is positioned at the valve closing position.

In one embodiment, the valve element of the opening/closing valve unit can be supported by a diaphragm portion having an outer peripheral edge sandwiched between the opening/closing drive unit housing and the valve main body.

It is preferable that the drive fluid in the second fluid chamber is supplied and discharged through a variable throttle valve with a check valve.

Advantageous Effect of the Invention

According to the suck-back valve of the present invention, it is possible to start the suck-back operation with a small discharge amount of drive fluid. For this reason, in the case where the suck-back mechanism unit and the opening/closing valve unit for performing the opening and closing of the flow passage arranged upstream of the suck-back mechanism unit are connected to one common switching valve and the switching valve is used to switch the drive fluid from supply to discharge so that the opening/closing valve unit is closed and the suck-back mechanism unit starts the suck-back operation, it is possible to start the suck-back operation at an earlier timing after closing the flow of the fluid by the opening/closing valve, and further it is also possible to reduce the discharge flow rate of the drive fluid by that amount and perform the suck-back operation more gently.

DESCRIPTION OF EMBODIMENTS

Figure 1:
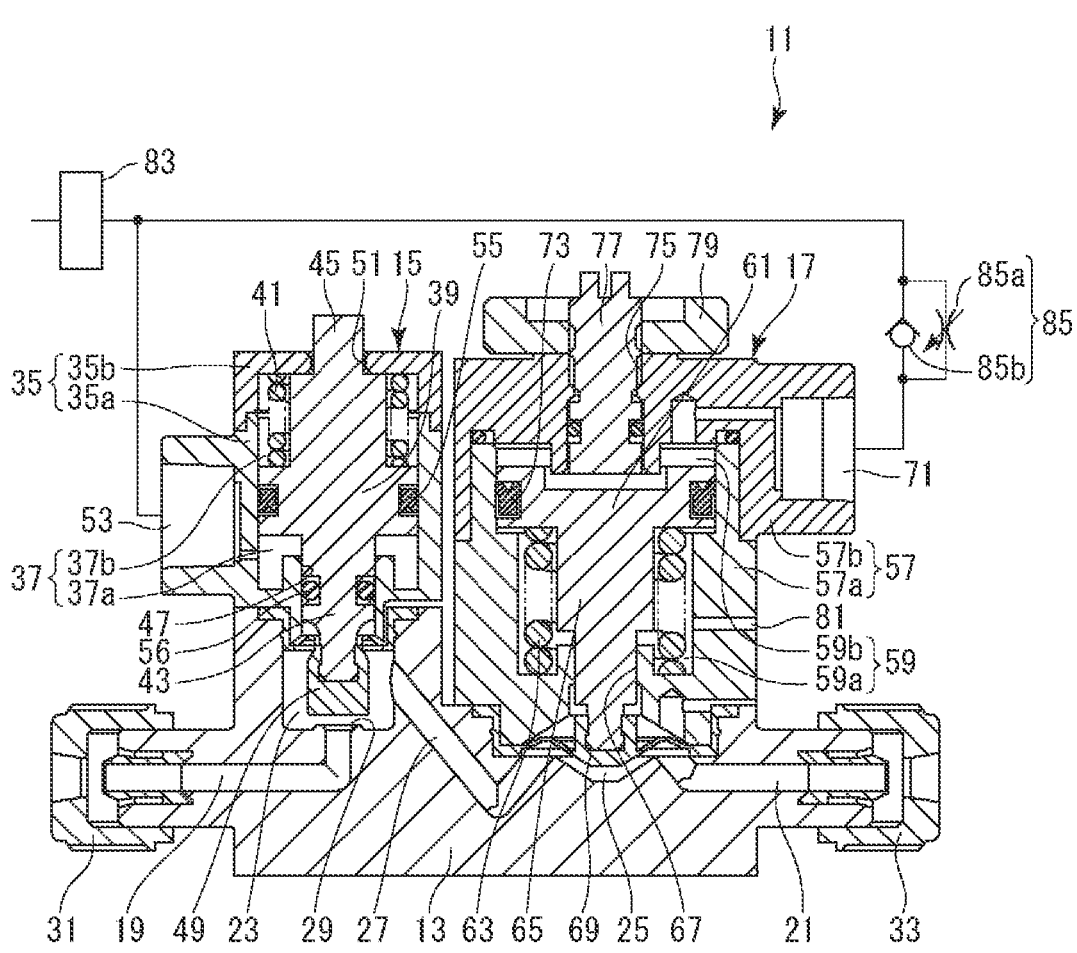
FIG. 1 is a vertical cross-sectional view of a suck-back valve according to one embodiment of the present invention, showing a state in which an opening/closing piston of an opening/closing valve unit is positioned at a valve opening position and a suck-back piston of a suck-back mechanism unit is positioned at a standby position.

While embodiments of a suck-back valve according to the present invention will be described below with reference to the drawings, it goes without saying that the present invention should not be limited to the shown embodiments.

First, an overall configuration of a suck-back valve 11 according to one embodiment of the present invention will be described with reference to FIG. 1. The suck-back valve 11 includes a valve main body 13 formed with a fluid passage, an opening/closing valve unit 15 which opens and closes the fluid passage, and a suck-back mechanism unit 17 which sucks back the fluid in the flow passage. The opening/closing valve unit 15 and the suck-back mechanism unit 17 are attached to the upper portion of the valve main body 13. The suck-back mechanism unit 17 is arranged downstream of the opening/closing valve unit 15. After the fluid passage is closed by the opening/closing valve unit 15 to shut off the flow of the fluid, the suck-back mechanism unit 17 sucks back the fluid in the fluid passage to make it possible to prevent the fluid from leaking and dripping out of the end of the fluid passage.

The fluid passage including an inlet flow passage 19 and an outlet flow passage 21 is formed in the valve main body 13. Further, there is provided downstream of the inlet flow passage 19 a valve chamber 23 which opens upward, and there is provided upstream of the outlet flow passage 21 a suck-back chamber 25 which opens upward. the valve chamber 23 and the suck-back chamber 25 are connected between each other by a communication passage 27. In the valve main body 13 configured in this way, the fluid supplied to the inlet flow passage 19 is discharged from the outlet flow passage 21 through the valve chamber 23, the communication passage 27, and the suck-back chamber 25. In the shown embodiment, the inlet flow passage 19 opens into a bottom surface of the valve chamber 23, and the outlet flow passage 21 opens into a bottom surface of the suck-back chamber 25. Also, the communication passage 27 opens into a side surface of the valve chamber 23 and the bottom surface of the suck-back chamber 25. There is formed around the opening of the inlet flow passage 19 into the valve chamber 23 an annular valve seat 29 which a valve element 49, described later, is brought into contact with and away from. Further, joints 31 and 33 for connecting piping such as tubes are provided at an upstream end of the inlet flow passage 19 and a downstream end of the outlet flow passage 21, respectively. However, as long as the fluid having flowed into the inlet flow passage 19 is discharged from the outlet flow passage 21 via the valve chamber 23, the communication passage 27, and the suck-back chamber 25, the fluid passage will not be limited to the configuration shown in the figure.

The opening/closing valve unit 15 includes an opening/closing drive unit housing 35 having an opening/closing cylinder chamber 37 formed therein, an opening/closing piston 39 accommodated in the opening/closing cylinder chamber 37, and an opening/closing biasing member 41 biasing the opening/closing piston 39. The opening/closing drive unit housing 35 is constituted by an opening/closing bonnet 35a formed therein with an accommodation space of a circular cross section and a substantially cylindrical shape, and an opening/closing lid member 35b attached to the top of the opening/closing bonnet 35a to close an opening at the top of the opening/closing bonnet 35a. The opening/closing cylinder chamber 37 is formed by a space surrounded by an inner peripheral surface and a bottom surface of the accommodation space of the opening/closing bonnet 35a and a bottom surface of the opening/closing lid member 35b. The opening/closing piston 39 has a substantially disk shape and is accommodated in the opening/closing cylinder chamber 37 so as to be vertically slidable in the figure along the peripheral wall thereof (i.e., the inner peripheral surface thereof). The opening/closing cylinder chamber 37 is divided into a first fluid chamber 37a which is surrounded by the opening/closing piston 39 (specifically, the top surface thereof), the inner peripheral surface of the opening/closing cylinder chamber 37 (specifically, the opening/closing bonnet 35a), and a ceiling surface of the opening/closing cylinder chamber 37 (i.e., the bottom surface of the opening/closing lid member 35b) and which is positioned on the side close to the valve chamber 23, and a second fluid chamber 37b which is surrounded by the opening/closing piston 39 (specifically, the bottom surface thereof), the inner peripheral surface of the opening/closing cylinder chamber 37 (specifically, the opening/closing bonnet 35a), and a bottom surface of the opening/closing cylinder chamber 37 (i.e., a bottom portion of the opening/closing bonnet 35a) and which is positioned on the side far from the valve chamber 23. In the embodiment shown in FIG. 1, the first fluid chamber 37a is positioned below the opening/closing piston 39, and the second fluid chamber 37b is positioned above the opening/closing piston 39.

The opening piston 39 is connected to an opening/closing stem 43 which is thinner than the opening/closing piston 39 and extends downward in the figure in a direction to approach the valve chamber 23, and is connected to a guide shaft 45 which is thinner than the opening/closing piston 39 and extends upward in the figure in a direction away from the valve chamber 23, i.e., in the opposite direction to the opening/closing stem 43. The opening/closing stem 43 is slidably inserted through a through hole 47 formed to extend through the bottom portion of the opening/closing cylinder chamber 37 (specifically, the opening/closing bonnet 35a) of the opening/closing drive unit housing 35 and extends into the valve chamber 23, and a valve element 49 is connected to the tip end of the opening/closing stem 43. The valve element 49 has a shape in which a truncated cone is connected onto a cylinder, and is arranged so that the bottom surface thereof faces the valve seat 29. The guide shaft 45 is inserted through a through hole 51 formed to extend through the opening/closing lid member 35b and extends to the outside, and is configured to guide the reciprocating motion of the opening/closing piston 39. The valve element 49 can open and close the fluid passage by being brought in contact with and away from the valve seat 29 formed in the valve chamber 23 via the opening/closing stem as the opening/closing piston 39 reciprocates vertically in the opening/closing cylinder chamber 37.

The opening/closing biasing member 41 is arranged in a compressed state between the ceiling surface of the opening/closing cylinder chamber 37 (i.e., the bottom surface of the opening/closing lid member 35*b*) and the opening/closing piston 39 (specifically, the top surface thereof) in the second fluid chamber 37*b*, so that the opening/closing biasing member 41 always biases the opening/closing piston 39 in a direction to cause the valve element 49 connected to the tip of the opening/closing stem 43 to approach toward the valve seat 29. In the embodiment shown in FIG. 1, a coil spring is used as the opening/closing biasing member 41, and the coil spring is arranged to spirally extend around the guide shaft 45 within the second fluid chamber 37*b*. However, as long as it is possible to bias the opening/closing piston 39 so as to cause the valve element 49 to approach toward the valve seat 29, the opening/closing biasing member 41 is not limited to the coil spring, and can also be, for example, a cylindrical elastic body or the like.

The opening/closing cylinder chamber 37 (specifically, the opening/closing bonnet 35*a*) has an opening/closing drive fluid port 53 provided on a peripheral wall thereof at a position not closed by the opening/closing piston 39. When the pressure of the drive fluid in the second fluid chamber 37*a* is increased by supplying the drive fluid to the first fluid chamber 37*a* through the opening/closing drive fluid port 53 in a state where the valve element 49 is pressed against the valve seat 29 by a biasing force of the opening/closing biasing member 41, the force acting on the opening/closing piston 39 due to the pressure of the drive fluid in the first fluid chamber 37*a* (hereinafter may be described as a "force due to the drive fluid") exceeds the force acting on the opening/closing piston 39 by the opening/closing biasing member 41 (hereinafter may be described as a "biasing force by the opening/closing biasing member 41"), and further overcomes the static friction between the opening/closing piston 39 (specifically, the outer peripheral surface thereof and a seal member 55, described later, attached to the outer peripheral surface) and the inner peripheral surface of the opening/closing cylinder chamber 37, so that the opening/closing piston 39 moves in a direction to separate from the valve chamber 23 against the biasing force by the opening/closing biasing member 41 to thereby increase the volume of the first fluid chamber 37*a*. Consequently, the valve element 49 connected to the opening/closing piston 39 via the opening/closing stem 43 is separated from the valve seat 29 to allow the start of the flow of the fluid in the fluid passage. When the pressure of the drive fluid in the first fluid chamber 37*a* becomes the maximum, the opening/closing piston 39 stops at the valve opening position. On the other hand, when the pressure of the drive fluid in the first fluid chamber 37*a* is reduced by discharging the drive fluid in the first fluid chamber 37*a* through the opening/closing drive fluid port 53 in a state where the valve element 49 is separated from the valve seat 29, the force due to the drive fluid falls below the biasing force by the opening/closing biasing member 41 and further overcomes the static friction between the opening/closing piston 39 (specifically, the outer peripheral surface thereof and the seal member 55, described later, attached to the outer peripheral surface) and the inner peripheral surface of the opening/closing cylinder chamber 37, so that the opening/closing piston 39 moves in a direction to approach the valve chamber 23 according to the biasing force by the opening/closing biasing member 41 to thereby reduce the volume of the first fluid chamber 37*a*. Consequently, the valve element 49 connected to the opening/closing piston 39 via the opening/closing stem 43 is pressed against the valve seat 29 so that the opening/closing piston 39 stops at the valve closed position, thereby making it possible to close off the flow of the fluid in the fluid passage. For example, compressed air or the like can be used as the drive fluid.

Incidentally, the air in the second fluid chamber 37*b* is released to the outside from a gap between an outer peripheral surface of the guide shaft 45 and an inner peripheral surface of the through hole 51 of the opening/closing lid member 35*b*. This makes it hard to obstruct the sliding of the opening/closing piston 39 in the opening/closing cylinder chamber 37. Further, there is the seal member 55 attached to the outer peripheral surface of the opening/closing piston 39, so that the opening/closing piston 39 can slide on the inner peripheral surface of the opening/closing cylinder chamber 37 in a sealed state so as to prevent the drive fluid from leaking from the first fluid chamber 37*a* to the second fluid chamber 37*b*. There is also a seal member 56, such as an O-ring, attached to the outer peripheral surface of the opening/closing stem 43, so that the opening/closing stem 43 can slide on the inner peripheral surface of the through hole 47 in a sealed state so as to prevent the drive fluid from leaking out to the outside from the first fluid chamber 37*a*.

In the embodiment shown in FIG. 1, there is provided a thin film-like diaphragm portion 49*a* extending radially outward from an outer peripheral portion of an upper end of the valve element 49. The diaphragm portion 49*a* has an outer peripheral edge sandwiched between the valve main body 13 and the opening/closing bonnet 35*a*, and the valve element 49 is in a state of being supported in the valve chamber 23 via the diaphragm portion 49*a*. By taking the form of supporting the valve element 49 in the valve chamber 23 via the diaphragm portion 49*a* in this manner, the valve chamber 23 and the opening/closing drive unit housing 35 are partitioned from each other by the diaphragm portion 49*a*. Therefore, when the fluid flowing through the fluid passage is a corrosive fluid or the like, the fluid in the valve chamber 23 can be prevented from entering the opening/closing cylinder chamber 37 or the like to corrode the opening/closing drive unit housing 35 or the like.

The suck-back mechanism unit 17 includes a suck-back drive unit housing 57 having a suck-back cylinder chamber 59 formed therein, a suck-back piston 61 accommodated in the suck-back cylinder chamber 59, and a suck-back biasing member 63 biasing the suck-back piston 61. The suck-back drive unit housing 57 is constituted by a suck-back bonnet 57*a* formed therein with an accommodation space of a circular cross section and a substantially cylindrical shape, and a suck-back lid member 57*b* attached to the top of the suck-back bonnet 57*a* to close an opening at the top of the suck-back bonnet 57*a*. The suck-back cylinder chamber 59 is formed by a space surrounded by an inner peripheral surface and a bottom surface of the accommodation space of the suck-back bonnet 57*a* and a bottom surface of the suck-back lid member 57*b*. The suck-back piston 61 has a substantially disk shape and is accommodated in the suck-back cylinder chamber 59 so as to be vertically slidable in the figure along the peripheral wall thereof (i.e., the inner peripheral surface thereof). The suck-back cylinder chamber 59 is divided into a first fluid chamber 59*a* which is surrounded by the suck-back piston 61 (specifically, the top surface thereof), the inner peripheral surface of the suck-back cylinder chamber 59 (i.e., the suck-back bonnet 57*a*), and a ceiling surface of the suck-back cylinder chamber 59 (i.e., the bottom surface of the suck-back lid member 57*b*) and which is positioned on the side close to the suck-back chamber 25, and a second fluid chamber 59*b* which is surrounded by the suck-back piston 61 (specifically, the bottom surface thereof), the inner peripheral surface of the suck-back cylinder chamber 59 (i.e., the suck-back bonnet 57a), and a bottom surface of the suck-back cylinder chamber 59 (i.e., a bottom portion of the suck-back bonnet 57a) and which is positioned on the side far from the suck-back chamber 25. In the embodiment shown in FIG. 1, the first fluid chamber 59a is positioned below the suck-back piston 61, and the second fluid chamber 59b is positioned above the suck-back piston 61.

The suck-back piston 61 is connected to a suck-back stem 65 which is thinner than the suck-back piston 61 and extends downward in the figure in a direction to approach the suck-back chamber 25. The suck-back stem 65 is slidably inserted through a through hole 67 formed to extend through the bottom portion of the suck-back bonnet 57a of the suck-back drive unit housing 57 and extends into the suck-back chamber 25, and a diaphragm 69 is connected to the tip end of the suck-back stem 65. The diaphragm 69 has an outer peripheral edge sandwiched between the valve main body 13 and the suck-back bonnet 57a, and the diaphragm 69 partitions the suck-back chamber 25 and the suck-back drive unit housing 57 from each other. The diaphragm 69 configured in this manner expands or retracts with respect to the suck-back chamber via the suck-back stem 65 as the suck-back piston 61 reciprocates vertically in the suck-back cylinder chamber 59, thereby increasing or decreasing the volume of the suck-back chamber 25. Thus, by increasing the volume of the suck-back chamber 25, the fluid in the outlet flow passage 21 connected to the downstream side of the suck-back chamber 25 can be sucked back.

The suck-back biasing member 63 is arranged in a compressed state between the bottom portion of the suck-back cylinder chamber 59 (i.e., the bottom portion of the suck-back bonnet 57a) and the suck-back piston 61 (specifically, the bottom surface thereof) in the first fluid chamber 59a, so that the suck-back biasing member 63 always biases the suck-back piston 61 in a direction to cause the diaphragm 69 connected to the tip of the suck-back stem 65 to retract from the suck-back chamber 25 (i.e., separate from the valve main body 13). In the embodiment shown in FIG. 1, a coil spring is used as the suck-back biasing member 63, and the coil spring is arranged to spirally extend around the suck-back stem 65 within the first fluid chamber 59a. However, as long as it is possible to bias the suck-back piston 61 so as to cause the diaphragm 69 to retract from the suck-back chamber 25, the suck-back biasing member 63 is not limited to the coil spring, and can also be, for example, a cylindrical elastic body or the like.

The suck-back cylinder chamber 59 (specifically, the suck-back bonnet 57a) has a suck-back drive fluid port 71 provided on a peripheral wall thereof at a position not closed by the suck-back piston 61. In the shown embodiment, the suck-back drive fluid port 71 is provided in the suck-back lid member 57b of the suck-back drive unit housing 57 so as to open to the ceiling surface of the suck-back cylinder chamber 59. When the pressure of the drive fluid in the second fluid chamber 59b is increased by supplying the drive fluid to the second fluid chamber 59b through the suck-back drive fluid port 71 in a state where the diaphragm 69 is retracted from the suck-back chamber 25 by the biasing force of the suck-back biasing member 63, the force acting on the suck-back piston 61 due to the pressure of the drive fluid in the second fluid chamber 59b (hereinafter may be described as a "force due to the drive fluid") exceeds the force acting on the suck-back piston 61 by the suck-back biasing member 63 (hereinafter may be described as a "biasing force by the suck-back biasing member 63"), and further overcomes the static friction between the suck-back piston 61 (specifically, the outer peripheral surface thereof and a seal member 73, described later, attached to the outer peripheral surface) and the inner peripheral surface of the suck-back cylinder chamber 59, so that the suck-back piston 61 moves in a direction to approach the suck-back chamber 25 against the biasing force by the suck-back biasing member 63 to thereby increase the volume of the second fluid chamber 59b. Consequently, the diaphragm 69 connected to the suck-back piston 61 via the suck-back stem 65 expands into the suck-back chamber 25, and the suck-back piston 61 stops at the standby position when the pressure of the drive fluid in the second fluid chamber 59b reaches the maximum. On the other hand, when the pressure of the drive fluid in the second fluid chamber 59b is reduced by discharging the drive fluid in the second fluid chamber 59b through the suck-back drive fluid port 71 in a state where the suck-back piston 61 is at the standby position and the diaphragm 69 is expanded into the suck-back chamber 25, the force due to the drive fluid falls below the biasing force by the suck-back biasing member 63 and further overcomes the static friction between the suck-back piston 61 (specifically, the outer peripheral surface thereof and the seal member 73, described later, attached to the outer peripheral surface) and the inner peripheral surface of the suck-back cylinder chamber 59, so that the suck-back piston 61 moves in a direction to approach the suck-back chamber 25 according to the biasing force by the suck-back biasing member 63 to thereby reduce the volume of the second fluid chamber 59b. Consequently, the diaphragm 69 connected to the suck-back piston 61 through the suck-back stem 65 retracts from the suck-back chamber 25 to increase the volume of the suck-back chamber 25, thereby sucking back the fluid in the outlet flow passage 21 being in communication with the suck-back chamber 25. The suck-back operation is completed when the suck-back piston 61 reaches the suck-back position.

In the suck-back mechanism unit 17, the suck-back piston 61 is slidable between a top dead center position located on the upper side (the side farther from the suck-back chamber 25) in the suck-back cylinder chamber 59 and a bottom dead center position located on the lower side (the side closer to the suck-back chamber) therein. In the present specification, a "dead center position" means a limit position of movement where the suck-back piston 61 is brought into contact with a specific portion of another member to restrict the movement thereof. In the shown embodiment, the suck-back cylinder chamber 59 includes a large diameter portion which accommodates the suck-back piston 61 and a small diameter portion smaller in diameter than the large diameter portion, and is provided with a stepped portion between the large diameter portion and the small diameter portion, so that the bottom dead center position of the suck-back piston 61 is defined by interference of the suck-back piston 61 with the stepped portion. Further, in the shown embodiment, the suck-back lid member 57b is formed in the central portion thereof with a through hole 75 which extends through the suck-back lid member 57b and has a thread groove on at least a portion of the inner peripheral surface thereof. There is an adjustment screw 77 screwed into the through hole 75 in a sealed state so as to be able to protrude from the ceiling portion of the suck-back cylinder chamber 59 into the second fluid chamber 59b. The adjustment screw 77 has a portion protruded outside from the suck-back lid member 57b, and a lock nut 79 is screwed to that portion, so that the rotation of the adjustment screw 77 can be locked by tightening the lock nut 79. When the adjustment screw 77 protrudes into the second fluid chamber 59b, the suck-back piston 61 (specifically, the top surface thereof) abuts against the adjustment screw 77 so that the movement thereof is restricted. When the adjustment screw 77 does not protrude into the second fluid chamber 59*b*, the suck-back piston 61 abuts against the ceiling portion (specifically, the bottom portion of the suck-back lid member 57*b*) of the suck-back cylinder chamber 59 so that the movement thereof is restricted. Thus, the top dead center position of the suck-back piston 61 is defined. That is, the suck-back position being the position of the suck-back piston 61 when the suck-back operation by the suck-back mechanism unit 17 is completed and the pressure of the drive fluid in the second fluid chamber 59*b* at that time can be adjusted by the adjustment screw 77.

Incidentally, there is a ventilation hole 81 provided at a peripheral wall of the small-diameter portion of the suck-back cylinder chamber 59, i.e., at a position which is not closed by the suck-back piston 61, to allow ventilation between the first fluid chamber 59*a* and the outside, so that the air in the first fluid chamber 59*a* may hardly obstruct the movement of the suck-back piston 61.

The opening/closing drive fluid port 53 of the opening/closing valve unit 15 and the suck-back drive fluid port 71 of the suck-back mechanism unit 17 are connected to a switching valve 83 by branched piping and connected to one common drive fluid source (not shown) via the switching valve 83. The switching valve 83 is capable of switching between the supply of drive fluid from the drive fluid source to the opening/closing drive fluid port 53 and the suck-back drive fluid port 71 and the discharge of the drive fluid from the opening/closing drive fluid port 53 and the suck-back drive fluid port 71 to the outside. Further, there is provided between the switching valve 83 and the suck-back drive fluid port 71 a variable throttle valve 85 with a check valve, having a form in which a variable throttle valve portion 85*a* and a check valve portion 85*b* are disposed in parallel. The variable throttle valve portion 85*a* can adjust and change the flow rate of the passing drive fluid, so that the timings of the start and completion of the suck-back operation can be adjusted by adjusting the flow rate of the drive fluid supplied to and discharged from the suck-back drive fluid port 71. Further, the check valve portion 85*b* allows passage of the drive fluid in the direction of supplying the drive fluid from the drive fluid source to the suck-back drive fluid port 71, while the check valve portion 85*b* prevents passage of the drive fluid in the direction to discharge the drive fluid from the suck-back drive fluid port 71 to the outside. Consequently, the time required to discharge the drive fluid from the second fluid chamber 59*b* of the suck-back cylinder chamber 59 through the suck-back drive fluid port 71 to move the suck-back piston 61 from the standby position to the suck-back position is made longer than the time required to supply the drive fluid to the second fluid chamber 59*b* of the suck-back cylinder chamber 59 through the suck-back drive fluid port 71 to move the suck-back piston 61 from the suck-back position to the standby position to gently perform the suck-back operation, thereby making it possible to suppress the drive fluid remaining by adhering to an inner peripheral surface of a nozzle (not shown) connected to the outlet flow passage due to the rapid suck-back operation from collecting and dripping out of the nozzle.

In the suck-back valve 11, the standby position of the suck-back piston 61 in the suck-back mechanism unit 17 is set to be away from the bottom dead center position to the top dead center position side, i.e., upward. That is, even when the pressure of the drive fluid supplied to the second fluid chamber 59*b* of the suck-back cylinder chamber 59 through the suck-back drive fluid port 71 reaches the maximum, the suck-back piston 61 stops at a position away from the bottom dead center position.

When the suck-back piston 61 reaches the bottom dead center position, for example, in the shown embodiment, the bottom surface of the suck-back piston 61 interferes with the stepped portion between the large diameter portion and the small diameter portion of the suck-back cylinder chamber 59 to bring about a state in which the movement thereof is restricted, thereby prohibiting the suck-back piston 61 from moving vertically from the bottom dead center position even if the drive fluid is supplied to the second fluid chamber 59*b* of the suck-back cylinder chamber 59 to increase the pressure of the drive fluid in the second fluid chamber 59*b*. Therefore, when the pressure of the drive fluid in the second fluid chamber 59*b* increases from this state, the force due to the drive fluid becomes a state of exceeding the biasing force by the suck-back biasing member 63, and the force due to the drive fluid becomes excessive compared to the state of balance with the biasing force by the suck-back biasing member 63. In order for the suck-back piston 61 to start moving upward in a direction of approaching from the bottom dead center position to the top dead center position, the drive fluid in the second fluid chamber 59*b* is required to be discharged to reduce the pressure, so that after first reducing the force due to the drive fluid in the second fluid chamber 59*b* until it becomes equal to the force by suck-back biasing member 63, the force due to the drive fluid is further reduced by an amount exceeding the static friction between the suck-back piston 61 and the inner peripheral surface of the suck-back cylinder chamber 59 (specifically, the suck-back bonnet 57*a*).

On the other hand, in the suck-back mechanism unit 17, the standby position of the suck-back piston 61 in the suck-back mechanism unit 17 is set to be away from the bottom dead center position to the top dead center position side, i.e., upward. In the standby position, the force due to the drive fluid in the second fluid chamber 59*b* is balanced with the biasing force by the suck-back biasing member 63. Therefore, the suck-back piston 61 can be started to move upward from the standby position in the direction approaching the top dead center (the direction away from the suck-back chamber 25) just by discharging the drive fluid in the second fluid chamber 59*b* to reduce the pressure of the drive fluid in the second fluid chamber 59*b*, and reducing the force due to the drive fluid in the second fluid chamber 59*b* by an amount exceeding the static friction between the suck-back piston 61 and the suck-back cylinder chamber 59. That is, the suck-back operation can be started earlier by the time required to discharge the drive fluid from the second fluid chamber 59*b* so as to reduce the force due to the drive fluid in the second fluid chamber 59*b* until it becomes equal to the force by the suck-back biasing member 63. This results in reduction of a delay time required for the suck-back mechanism unit 17 to start the suck-back operation after the supply of the drive fluid to the opening/closing valve unit 15 and the suck-back mechanism unit 17 is switched to the discharge thereof from these by the switching valve 83 and the opening/closing valve unit 15 reaches the valve closed state. Further, the amount of discharge of the drive fluid from the second fluid chamber 59*b* is reduced by the amount of the drive fluid to be discharged from the second fluid chamber 59*b* in order to reduce the force due to the drive fluid in the second fluid chamber 59*b* until it becomes equal to the force by the suck-back biasing member 63. Therefore, the flow rate of the drive fluid to be discharged from the second fluid chamber 59*b* can be reduced by adjusting the variable throttle valve 85 with the check valve. As a result, the speed of decrease in pressure of the drive fluid in the second fluid chamber 59*b* is reduced, and the moving speed of the suck-back piston 61 is reduced to make the suck-back operation gentle. Therefore, it is possible to suppress the fluid remaining by adhering to the inner peripheral surface of the nozzle being in communication with the outlet flow passage 21 from collecting and dripping out of the nozzle during the suck-back operation.

Further, in the suck-back mechanism unit 17, a lip packing is used as the seal member 73. Here, the lip packing is a packing having a lip structure part in a sealing portion (pressure receiving portion) and refers to one which can appropriately maintain contact pressure on the seal surface by the lip structure part deforming and following the movement of the sliding surface and changes in pressure. The seal packing includes a J packing, an L packing, a U packing, a V packing, a Y packing, and the like. In the shown embodiment, the Y packing is used as the seal member 73. When the Y packing is used, branched lip portions of the Y packing are arranged toward the second fluid chamber 59*b*. This can enhance the function of preventing the drive fluid in the second fluid chamber 59*b* from leaking into the first fluid chamber 59*a*.

The frictional force between the inner peripheral surface of the suck-back cylinder chamber 59 and the suck-back piston 61 is greatly affected by the friction between the inner peripheral surface of the suck-back cylinder chamber 59 and the seal member 73 attached to the outer peripheral portion of the suck-back piston 61. Further, as described above, since the lip structure part deforms and follows the movement of the sliding surface and changes in pressure, thereby making it possible to appropriately maintain the contact pressure and exhibit a seal function, the lip packing is capable of keeping seal pressure low. Therefore, the friction between the inner peripheral surface of the suck-back cylinder chamber 59 and the suck-back piston 61 can be reduced by using the lip packing as the seal member 73. As a result, when starting the suck-back operation, the amount of discharge of the drive fluid required until the force obtained by subtracting the biasing force by the suck-back biasing member 63 from the force due to the drive fluid in the second fluid chamber 59*b* of the suck-back cylinder chamber 59 exceeds the static frictional force between the inner peripheral surface of the suck-back cylinder chamber 59 and the suck-back piston 61 can be reduced, so that the suck-back operation can be started earlier by such the time required for the discharge of the drive fluid. Further, if the amount of discharge of the drive fluid required until the force obtained by subtracting the biasing force by the suck-back biasing member 63 from the force due to the drive fluid in the second fluid chamber 59*b* of the suck-back cylinder chamber 59 exceeds the static friction between the inner peripheral surface of the suck-back cylinder chamber 59 and the suck-back piston 61 is reduced, it is possible to bring about room to reduce the flow rate of the drive fluid when discharged from the second fluid chamber 59*b*. As a result, the moving speed of the suck-back piston 61 can also be reduced to slow down the suck-back operation, and the effect of suppressing dripping out of the nozzle can also be obtained.

Incidentally, since the seal performance required between a movable member and a stationary member in the suck-back mechanism unit 17 is lower than that in the opening/closing valve unit 15, the seal member between the movable member and the stationary member is not provided except for the seal member 73 in the suck-back mechanism unit 17 and the seal member is not attached to the outer peripheral surface of the suck-back stem 65. Since this leads to a reduction in the static friction of the suck-back piston 61 connected to the suck-back stem 65, it is possible to obtain the same effect as using the lip packing as the seal member 73. Further, even in the opening/closing valve unit 15, the lip packing may be used as the seal member 55 in the same way as the seal member 73, as shown in the embodiment, so that the frictional force between the opening/closing piston 39 and the inner peripheral surface of the opening/closing cylinder chamber 37 is reduced to speed up the start of the opening/closing piston 39.

Further, the volume of the suck-back cylinder chamber 59 of the suck-back mechanism unit 17 is larger than the volume of the opening/closing cylinder chamber 37 of the opening/closing valve unit 15. In the shown embodiment, the diameters of the large diameter portion and the small diameter portion of the suck-back cylinder chamber 59 are larger than the diameter of the opening/closing cylinder chamber 37. However, for example, when making the widths of the opening/closing valve unit 15 and the suck-back mechanism unit 17 the same, the cross-sectional shape of the suck-back cylinder chamber 59 may be set to be elliptical or rectangular with rounded corners (oval shape). When the opening/closing cylinder chamber 37 and the suck-back cylinder chamber 59 are made to have the same diameter, the suck-back cylinder chamber 59 may be made longer than the opening/closing cylinder chamber 37. The larger the volume of the suck-back cylinder chamber 59, the larger the volume of the second fluid chamber 59*b* when the suck-back piston 61 is at the standby position. Thus, assuming that the same amount (volume) of drive fluid is discharged during the suck-back operation, the larger the volume of the suck-back cylinder chamber 59, the lower the rate of change in volume of the second fluid chamber 59*b* per discharging amount of the drive fluid (that is, the rate of change of the force due to the drive fluid). For example, assuming that the same amount (volume) of drive fluid is discharged during the suck-back operation, the larger the diameter of the suck-back cylinder chamber 59, the more the amount of movement of the suck-back piston 61 in the second fluid chamber 59*b* per discharging amount of the drive fluid is reduced. As a result, even in the same amount of discharge of the drive fluid, the moving speed of the suck-back piston 61 can be reduced to perform the suck-back operation more gently, thus making it possible to suppress leaking and dripping out of the nozzle being in communication with the outlet flow passage 21. It is preferable that the opening/closing valve unit 15 is brought into the valve closed state as soon as possible after the discharge of the drive fluid is started. Therefore, If the volume of the suck-back cylinder chamber 59 of the suck-back mechanism unit 17 is set to be at least larger than the volume of the opening/closing cylinder chamber 37 of the opening/closing valve unit 15, the above effects can be effective.

In addition, in the suck-back valve 11, the opening/closing biasing member 41 and the suck-back biasing member 63 are configured such that the pressure of the drive fluid in the second fluid chamber 59*b* of the suck-back cylinder chamber 59 when the suck-back piston 61 is positioned at the suck-back position where the suck-back operation is completed is lower than the pressure of the drive fluid in the first fluid chamber 37*a* of the opening/closing cylinder chamber 37 when the opening/closing piston 39 is positioned at the valve closing position. For example, the opening/closing biasing member 41 and the suck-back biasing member 63 may be selected so that such a biasing force that the biasing force by the suck-back biasing member 63 is lower than the biasing force by the opening/closing biasing member 41 is obtained. For example, if the suck-back biasing member 63 having a weaker biasing force is selected and the pressure of the drive fluid in the second fluid chamber 59b of the suck-back cylinder chamber 59 when the suck-back piston 61 is positioned at the suck-back position where the suck-back operation is completed is set to be low, the biasing force by the suck-back biasing member 63 is also reduced in the vicinity of the suck-back position. Therefore, the flow rate of the drive fluid discharged from the second fluid chamber 59b by the biasing force by the suck-back biasing member 63 is also reduced. As a result, since the moving speed of the suck-back piston 61 is also reduced, the suck-back operation can be performed more gently, and the effect of suppressing leaking out and dripping out of the nozzle being in communication with the outlet flow passage 21 can be obtained.

Next, the suck-back operation performed by the suck-back valve 11 will be described with reference to FIGS. 1 to 3. FIG. 1 shows a state in which fluid flows in the fluid passage of the suck-back valve 11. In this state, the switching valve 83 is switched to supply the drive fluid from the drive fluid source, not shown, to the opening/closing drive fluid port 53 and the suck-back drive fluid port 71. At this time, the force due to the drive fluid supplied to the first fluid chamber 37a of the opening/closing cylinder chamber 37 through the opening/closing drive fluid port 53 causes the opening/closing piston 39 to be pushed up in the direction to separate from the valve chamber 23 against the biasing force by the opening/closing biasing member 41 and moved to the valve opening position. Thus, the valve element 49 connected to the tip of the opening/closing stem 43 separates from the valve seat 29 as the opening/closing piston 39 moves upward, and the fluid flowing into the inlet flow passage 19 flows out of the outlet flow passage 21 through the valve chamber 23, the communication passage 27, and the suck-back chamber 25. Also, the drive fluid supplied via the switching valve 83 is also supplied to the suck-back drive fluid port 71 through both the variable throttle valve portion 85a and the check valve portion 85b of the variable throttle valve 85 with the check valve. The force due to the drive fluid supplied to the second fluid chamber 59b of the suck-back cylinder chamber 59 through the suck-back drive fluid port 71 causes the suck-back piston 61 to be pushed down in the direction to approach the suck-back chamber 25 against the biasing force by the suck-back biasing member 63 and moved to the standby position. Consequently, the diaphragm 69 connected to the tip of the suck-back piston 61 becomes a state of being expanded into the suck-back chamber 25.

In order to close off the flow of the fluid using the suck-back valve 11, the switching valve 83 is switched from the state shown in FIG. 1 to allow the discharge of the drive fluid to the outside from piping connected to the opening/closing drive fluid port 53 and the suck-back drive fluid port 71.

When the drive fluid is discharged from the first fluid chamber 37a of the opening/closing cylinder chamber 37 through the opening/closing drive fluid port 53, the pressure of the drive fluid in the first fluid chamber 37a is reduced, so that the force due to the drive fluid in the first fluid chamber 37a falls below the biasing force by the opening/closing biasing member 41 and further overcome the static friction between the opening/closing piston 39 and the inner peripheral surface of the opening/closing cylinder chamber 37. As a result, as shown in FIG. 2, the opening/closing piston 39 is pushed down in the direction of approaching the valve chamber 23 by the biasing force by the opening/closing biasing member 41 and moved to the valve closing position. Consequently, the valve element 49 connected to the tip of the opening/closing stem 43 is brought into contact with and pressed against the valve seat, and the inflow of the fluid from the inlet flow passage 19 to the valve chamber 23 is shut off.

On the other hand, when the suck-back operation is suddenly performed upon shutting off the flow of the fluid by the suck-back valve 11, the fluid remaining by adherence to the inner peripheral surface of the nozzle (not shown) being in communication with the outlet flow passage 21 may gather and leak out and drip out of the nozzle. Therefore, it is preferable to reduce the amount of discharge of the drive fluid from the second fluid chamber 59b of the suck-back cylinder chamber 59 in order to gently perform the suck-back operation. Further, it is preferable that the suck-back operation is performed after the opening/closing valve unit 15 is brought into the valve closed state. Therefore, when the drive fluid is discharged from the second fluid chamber 59b of the suck-back cylinder chamber 59 through the suck-back drive fluid port 71, the drive fluid is allowed not to flow through the check valve portion 85b of the variable throttle valve 85 with the check valve in the direction toward the switching valve 83, but to be discharged only through the variable throttle valve portion 85a.

Consequently, the discharge flow rate of the drive fluid from the suck-back mechanism unit 17 becomes smaller than the discharge flow rate of the drive fluid from the opening/closing valve unit 15. Even if the switching valve 83 starts discharging the drive fluid at the same time as the opening/closing valve unit 15, the start of raising of the suck-back piston 61 in the direction to separate from the suck-back chamber 25 is delayed. Thus, even if the discharge of the drive fluid from opening/closing drive fluid port 53 and the suck-back drive fluid port 71 is started at the same time by switching of the switching valve 83, the suck-back piston 61 becomes a state of being not moved from the standby position when the opening/closing piston 39 is first moved to the valve closing position and the opening/closing valve unit 15 reaches the valve closed state as shown in FIG. 2.

Figure 2:
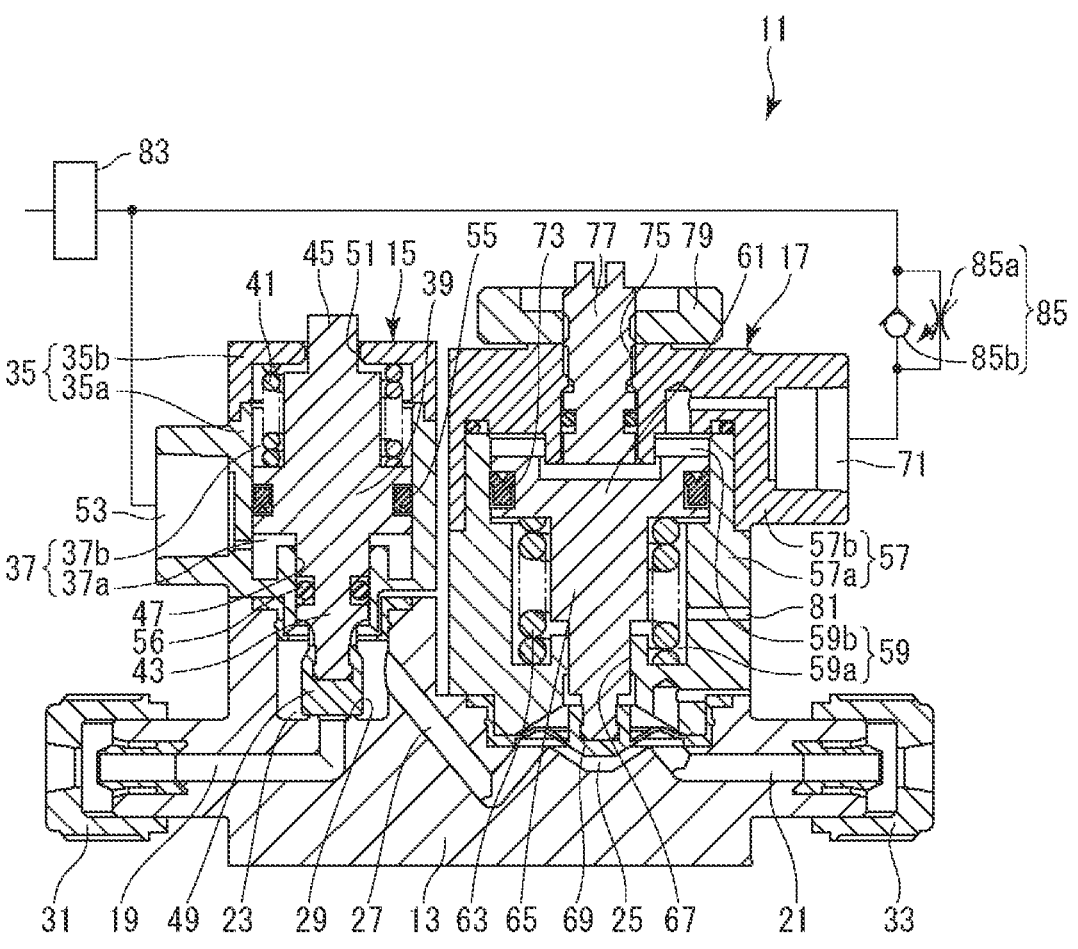
FIG. 2 is a vertical cross-sectional view when the state of the suck-back valve shown in FIG. 1 changes, showing a state in which the opening/closing piston of the opening/closing valve unit is positioned at a valve closing position and the suck-back piston of the suck-back mechanism unit is positioned at the standby position.
Figure 3:
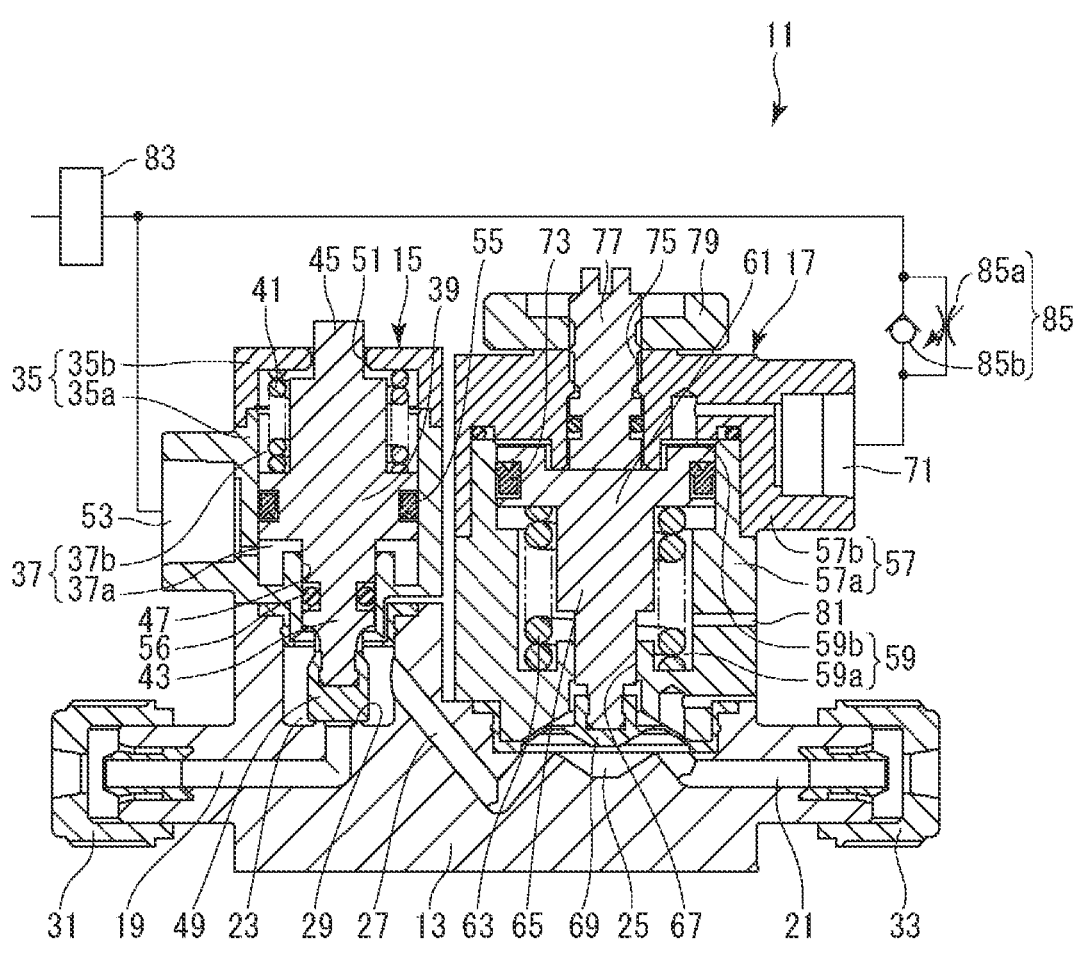
FIG. 3 is a vertical cross-sectional view when the state of the suck-back valve shown in FIG. 1 changes, showing a state in which the opening/closing piston of the opening/closing valve unit is positioned at the valve closing position and the suck-back piston of the suck-back mechanism unit is positioned at a suck-back position.

When the drive fluid continues to be discharged from the second fluid chamber 59b of the suck-back cylinder chamber 59 through the suck-back drive fluid port 71 from the state shown in FIG. 2 to further reduce the pressure of the drive fluid in the second fluid chamber 59b, the force obtained by subtracting the force due to the drive fluid in the second fluid chamber 59b from the biasing force by the suck-back biasing member 63 overcomes the static friction between the suck-back piston 61 and the inner peripheral surface of the suck-back cylinder chamber 59. Consequently, the suck-back piston 61 starts to move upward from the standby position in the direction of approaching the top dead center position (the direction away from the suck-back chamber 25). As the suck-back piston 61 moves upward due to the reduction in the pressure of the drive fluid in the second fluid chamber 59b, the diaphragm 69 connected to the suck-back piston 61 via the suck-back stem 65 is retracted from the suck-back chamber 25 to increase the volume of the suck-back chamber 25. As a result, the suck-back operation is performed. Thereafter, as shown in FIG. 3, when the suck-back piston 61 reaches the top dead center position, the suck-back operation is completed. In this manner, the suck-back valve 11 performs the suck-back operation by the suck-back mechanism unit 17 after the opening/closing valve unit 15 closes off the flow of the fluid, and prevents the fluid from dripping out of the nozzle being in communication with the outlet flow passage 21 after the valve is closed.

In general, in the opening/closing valve, even when the valve is brought into the valve closed state, the fluid in the fluid passage on the downstream side of the opening/closing valve moves due to inertia, so that fluid separation occurs to cause the fluid to leak out of the nozzle at the end of the fluid passage. Therefore, in the suck-back valve 11, the suck-back operation by the suck-back mechanism unit 17 is preferably started in as short a time as possible after the opening/ closing valve unit 15 reaches the valve closed state. Further, when the suck-back operation is suddenly performed after the opening/closing valve unit 15 is brought into the valve closed state, the fluid remaining by adherence to the inner peripheral surface of the nozzle at the end being in communication with the outlet flow passage 21 may gather and drip out of the nozzle. Therefore, it is preferable to perform the suck-back operation gently. In order to perform the suck-back operation gently, the discharge flow rate of the drive fluid from the second fluid chamber 59b of the suck-back cylinder chamber 59 through the suck-back drive fluid port 71 should be reduced. However, when the discharge flow rate is reduced, the start of the suck-back operation by the suck-back mechanism unit 17 is also delayed.

In order to solve this problem, the suck-back valve 11 reduces the delay from the closing of the flow of the fluid by the opening/closing valve unit 15 to the start of the suck-back operation by the suck-back mechanism unit 17, and has the following features in order to perform the suck-back operation gently.

(1) The standby position of the suck-back piston 61 in the suck-back mechanism unit 17 (the position of the suck-back piston 61 when the pressure of the drive fluid in the second fluid chamber 59b of the suck-back cylinder chamber 59 becomes the maximum) is set to be away from the bottom dead center position of the suck-back piston 61 in the suck-back cylinder chamber 59 toward the top dead center position, that is, upward. Therefore, at the standby position, the force due to the drive fluid in the second fluid chamber 59b becomes a state of being balanced with the biasing force by the suck-back biasing member 63. As a result, the suck-back operation can be started earlier by the time required to discharge the drive fluid from the second fluid chamber 59b in order to reduce the force due to the drive fluid in the second fluid chamber 59b so as to be equal to the force by the suck-back biasing member 63. Further, it is not necessary to reduce the amount of discharge of the drive fluid from the second fluid chamber 59b until the force due to the drive fluid in the second fluid chamber 59b and the force by the suck-back biasing member 63 become equal to each other. Therefore, it is possible to reduce the flow rate of the drive fluid when it is discharged from the second fluid chamber 59b. The speed of decrease in pressure of the drive fluid in the second fluid chamber 59b is reduced and the moving speed of the suck-back piston 61 is reduced, so that the suck-back operation is performed gently.

(2) The lip packing is used as the seal member 73 in the suck-back mechanism unit 17. As described above, the lip structure portion can actively deform and follow the movement of the sliding surface and changes in pressure, thereby making it possible to maintain contact pressure appropriately and exert the sealing function. Therefore, the lip packing can suppress the seal pressure low. Thus, by using the lip packing as the seal member 73 to reduce the friction between the inner peripheral surface of the suck-back cylinder chamber 59 and the suck-back piston 61, when the suck-back operation is started, the suck-back operation can be started earlier by the time required to discharge the drive fluid from the second fluid chamber 59b until the force obtained by subtracting the biasing force by the suck-back biasing member 63 from the force due to the drive fluid in the second fluid chamber 59b of the suck-back cylinder chamber 59 exceeds the static friction between the inner peripheral surface of the suck-back cylinder chamber 59 and the suck-back piston 61. Further, if the discharge amount of the drive fluid required to exceed the static friction is reduced, there can be formed room to reduce the flow rate of the drive fluid when discharged from the second fluid chamber 59b, and it is also possible to reduce the moving speed of the suck-back piston 61, thereby making the suck-back operation gentle.

(3) The volume of the suck-back cylinder chamber 59 of the suck-back mechanism unit 17 is larger than the volume of the opening/closing cylinder chamber 37 of the opening/ closing valve unit 15. In the shown embodiment, the diameters of the large diameter portion and the small diameter portion of the suck-back cylinder chamber 59 are larger than the diameter of the opening/closing cylinder chamber 37. Assuming that the same amount (volume) of drive fluid is discharged from the second fluid chamber 59b of the suck-back cylinder chamber 59 during the suck-back operation, the larger the volume of the suck-back cylinder chamber 59, the more the rate of change in volume of the second fluid chamber 59b (that is, the rate of change in force due to the drive fluid) per discharged amount of the drive fluid is reduced. For example, assuming that the same amount (volume) of drive fluid is discharged from the second fluid chamber 59b of the suck-back cylinder chamber 59 during the suck-back operation, the larger the diameter of the suck-back cylinder chamber 59, the more the amount of movement of the suck-back piston 61 in the second fluid chamber 59b per discharged amount of the drive fluid is reduced. Therefore, even in the case that the discharge flow rate of the drive fluid is the same, it is possible to reduce the moving speed of the suck-back piston 61 and perform the suck-back operation gently.

(4) The opening/closing biasing member 41 and the suck-back biasing member 63 are configured so that the pressure of the drive fluid in the second fluid chamber 59b of the suck-back cylinder chamber 59 when the suck-back piston 61 is positioned at the suck-back position where the suck-back operation is completed is lower than the pressure of the drive fluid in the first fluid chamber 37a of the opening/closing cylinder chamber 37 when the opening/ closing piston 39 is positioned at the valve closing position. If the pressure of the drive fluid in the second fluid chamber 59b of the suck-back cylinder chamber 59 when the suck-back piston 61 is positioned at the suck-back position where the suck-back operation is completed is set to be low, the biasing force by the suck-back biasing member 63 is also reduced in the vicinity of the suck-back position. Therefore, the discharge flow rate of the drive fluid from the inside of the second fluid chamber 59b is reduced to lower the moving speed of the suck-back piston 61, so that the suck-back operation can be performed more gently.

According to the above features (1) and (2), the time from when the opening/closing valve unit 15 is brought into the valve closed state to close off the flow of the fluid to the start of the suck-back operation can be shortened, and the amount of unintentional leakage or dripping of the fluid from the nozzle being in communication with the outlet flow passage 21 can be reduced. Further, according to the features (1) to (4), the moving speed of the suck-back piston 61 during the suck-back operation is reduced so that the suck-back operation is performed gently. Consequently, it is possible to suppress the fluid remaining by adherence to the inner peripheral surface of the nozzle being in communication with the outlet flow passage 21 from gathering and dripping out of the nozzle during the suck-back operation.

Figure 4:
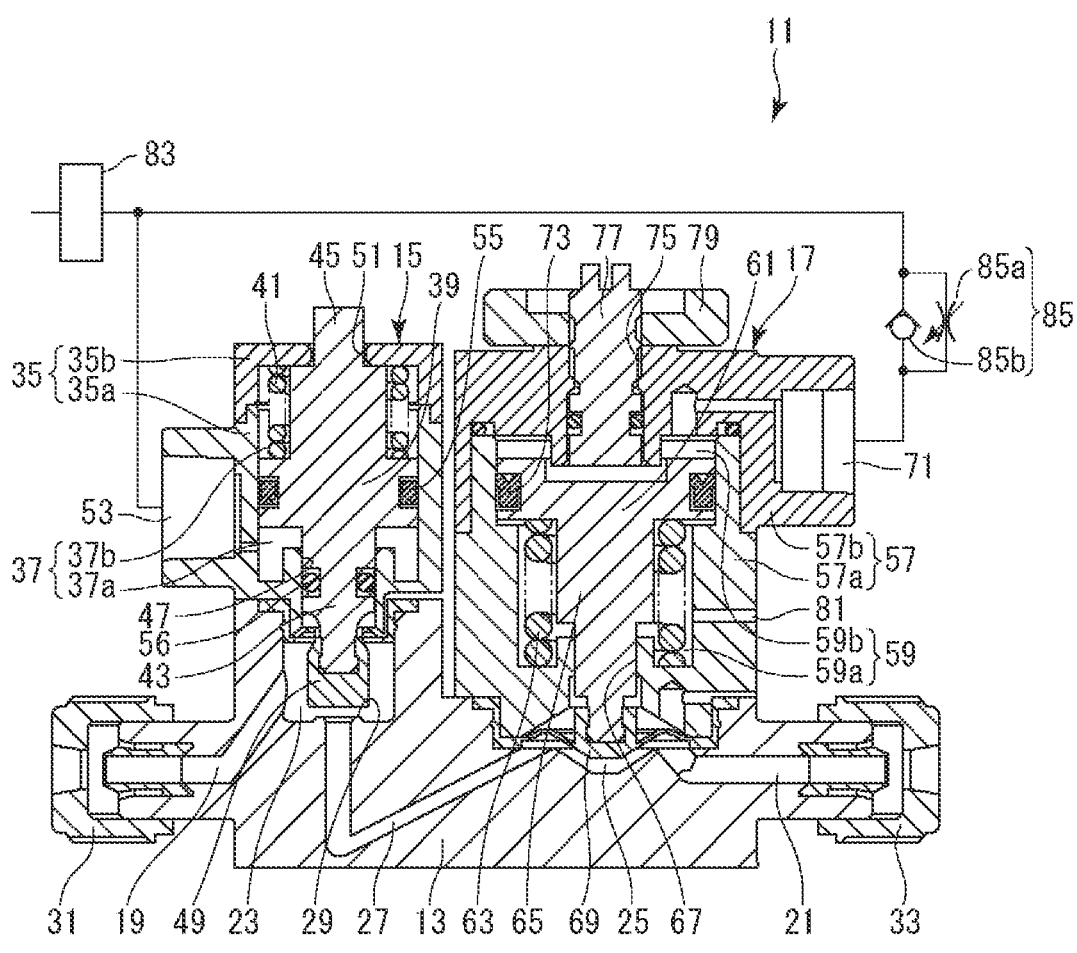
FIG. 4 is a vertical cross-sectional view of a suck-back valve according to a variation of the present invention.

Although the suck-back valve 11 according to the present invention has been described above with reference to the shown embodiment, the present invention is not limited to the shown embodiment. For example, in the shown embodiment, the inlet flow passage 19 opens into the bottom surface of the valve chamber 23, the communication passage 27 opens into the side surface of the valve chamber 23, and the valve seat 29 is formed around the opening from the inlet flow passage 19 to the valve chamber 23. However, as shown in FIG. 4, it is also possible to open the inlet flow passage 19 to the side surface of the valve chamber 23 and open the communication passage 27 to the bottom surface of the valve chamber 23, and to form the valve seat 29 around the opening from the communication passage 27 to the valve chamber 23. Further, the diaphragm portion 49a extends radially outward from the upper portion of the outer peripheral surface of the valve element 49 of the opening/closing valve unit 15, and the outer peripheral edge of the diaphragm portion 49a is sandwiched between the valve main body 13 and the opening/closing drive unit housing 35. However, it is also possible to omit the diaphragm portion 49a. Further, in the shown embodiment, the coil springs is used as the opening/closing biasing member 41 or the suck-back biasing member 63, but instead of or in addition to this, it is also possible to use an elastic body such as rubber.

DESCRIPTION OF REFERENCE NUMERALS 11 suck-back valve
13 valve main body
15 opening/closing valve unit
17 suck-back mechanism unit
19 inlet flow passage
21 outlet flow passage
23 valve chamber
25 suck-back chamber
29 valve chamber
35 opening/closing drive unit housing
37 opening/closing cylinder chamber
37a first fluid chamber
37b second fluid chamber
39 opening/closing piston
41 opening/closing biasing member
43 opening/closing stem
47 through hole
49 valve element
49a diaphragm portion
53 opening/closing drive fluid port
57 suck-back drive unit housing
59 suck-back cylinder chamber
61 suck-back piston
63 suck-back biasing member
65 suck-back stem
67 through hole
69 diaphragm
71 suck-back drive fluid port
73 seal member
85 variable throttle valve with check valve
The invention claimed is:

1. A suck-back valve comprising: a valve main body formed with a fluid flow passage for a fluid to flow therethrough, including an inlet flow passage and an outlet flow passage, and a suck-back chamber being in communication with the outlet flow passage; and a suck-back mechanism unit, used to suck back the fluid from the outlet flow passage by increasing the volume of the suck-back chamber, wherein the suck-back mechanism unit includes a suck-back drive unit housing having a suck-back cylinder chamber formed therein, a suck-back piston accommodated in the suck-back cylinder chamber and being slidable along an inner peripheral surface of the suck-back cylinder chamber between a first dead center position, which is a limit of movement on the side closer to the suck-back chamber, and a second dead center position, which is a limit of movement on the far side from the suck-back chamber, and a suck-back biasing member biasing the suck-back piston in a direction to increase the volume of the suck-back chamber, said suck-back cylinder chamber divided by the suck-back piston into a first fluid chamber and a second fluid chamber, said suck-back biasing member arranged in the first fluid chamber so that the suck-back piston can be moved, by supplying a drive fluid to the second fluid chamber to increase the volume of the second fluid chamber against a biasing force of the suck-back biasing member, from a suck-back position at which the suck-back piston is positioned when the increase in the volume of the suck-back chamber is completed, to a standby position at which the suck-back piston is positioned when pressure of the drive fluid in the second fluid chamber becomes the maximum, said standby position set to be away from the first dead center position.

2. The suck-back valve according to claim 1, wherein the suck-back mechanism unit further includes a diaphragm having an outer peripheral edge sandwiched between the suck-back drive unit housing and the valve main body, and a suck-back stem extending from the suck-back piston and inserted through a through hole formed in a bottom portion of the suck-back cylinder chamber, said diaphragm partitioning the suck-back drive unit housing and the suck-back chamber from each other, said diaphragm connected to a tip end of the suck-back stem so that the volume of the suck-back chamber is increased or decreased by deformation of the diaphragm accompanying movement of the suck-back piston.

3. The suck-back valve according to claim 2, wherein there is a seal member attached to an outer peripheral surface of the suck-back piston so as to seal between the suck-back piston and the inner peripheral surface of the suck-back cylinder chamber, and there is no seal member provided between an inner peripheral surface of the through hole and an outer peripheral surface of the suck-back stem.

4. The suck-back valve according to claim 3, wherein the seal member comprises a lip packing.

5. The suck-back valve according to claim 2, further comprising an opening/closing valve unit connected to a common switching valve from which the suck-back mechanism branches, said common switching valve switching the supply and discharge of the working fluid, wherein the valve main body is provided with a valve chamber which is in communication with the inlet flow passage and is in communication with the suck-back chamber via a communication passage, said valve chamber having a valve seat which the valve element is brought into contact with and away from, said valve seat formed in a peripheral edge of an opening from the inlet flow passage or the communication passage to the valve chamber, and wherein the opening/closing valve unit includes an opening/closing drive unit housing having an opening/closing cylinder chamber formed therein, an opening/closing piston accommodated in the opening/closing cylinder chamber and being slidable along an inner peripheral surface of the opening/closing cylinder chamber, an opening/closing stem extending from the opening/closing piston so as to penetrate a bottom portion of the opening/closing cylinder chamber and protrude into the valve chamber, and an opening/closing biasing member biasing the opening/closing piston in a direction to cause the valve element connected to a tip end of the opening/closing stem to approach the valve seat, and the volume of the suck-back cylinder chamber is larger than the volume of the opening/closing cylinder chamber.

6. The suck-back valve according to claim 5, wherein the opening/closing cylinder chamber is divided by the opening/closing piston into a third fluid chamber and a fourth fluid chamber, and the opening/closing biasing member is arranged in the fourth fluid chamber so that the opening/closing piston can be moved, by supplying the drive fluid to the third fluid chamber through the switching valve to increase the volume of the third fluid chamber against a biasing force of the opening/closing biasing member, from a valve closing position at which the valve element is seated on the valve seat to a valve opening position at which the opening/closing piston is positioned when the pressure of the drive fluid in the third fluid chamber becomes the maximum, said suck-back biasing member and said opening/closing biasing member configured so that the pressure of the drive fluid in the second fluid chamber when the suck-back piston is positioned at the suck-back position is lower than the pressure of the drive fluid in the third fluid chamber when the opening/closing piston is positioned at the valve closing position.

7. The suck-back valve according to claim 5, wherein the valve element of the opening/closing valve unit is supported by a diaphragm portion having an outer peripheral edge sandwiched between the opening/closing drive unit housing and the valve main body.

8. The suck-back valve according to claim 1, further comprising an opening/closing valve unit connected to a common switching valve from which the suck-back mechanism branches, said common switching valve switching the supply and discharge of the working fluid, wherein the valve main body is provided with a valve chamber which is in communication with the inlet flow passage and is in communication with the suck-back chamber via a communication passage, said valve chamber having a valve seat which a valve element is brought into contact with and away from, said valve seat formed in a peripheral edge of an opening from the inlet flow passage or the communication passage to the valve chamber, and wherein the opening/closing valve unit includes an opening/closing drive unit housing having an opening/closing cylinder chamber formed therein, an opening/closing piston accommodated in the opening/closing cylinder chamber and being slidable along an inner peripheral surface of the opening/closing cylinder chamber, an opening/closing stem extending from the opening/closing piston so as to penetrate a bottom portion of the opening/closing cylinder chamber and protrude into the valve chamber, and an opening/closing biasing member biasing the opening/closing piston in a direction to cause the valve element connected to a tip end of the opening/closing stem to approach the valve seat, and the volume of the suck-back cylinder chamber is larger than the volume of the opening/closing cylinder chamber.

9. The suck-back valve according to claim 8, wherein the diameter of the suck-back cylinder chamber is larger than the diameter of the opening/closing cylinder chamber.

10. The suck-back valve according to claim 8, wherein the opening/closing cylinder chamber is divided by the opening/closing piston into a third fluid chamber and a fourth fluid chamber, and the opening/closing biasing member is arranged in the fourth fluid chamber so that the opening/closing piston can be moved, by supplying the drive fluid to the third fluid chamber through the switching valve to increase the volume of the third fluid chamber against a biasing force of the opening/closing biasing member, from a valve closing position at which the valve element is seated on the valve seat to a valve opening position at which the opening/closing piston is positioned when the pressure of the drive fluid in the third fluid chamber becomes the maximum, said suck-back biasing member and said opening/closing biasing member configured so that the pressure of the drive fluid in the second fluid chamber when the suck-back piston is positioned at the suck-back position is lower than the pressure of the drive fluid in the third fluid chamber when the opening/closing piston is positioned at the valve closing position.

11. The suck-back valve according to claim 8, wherein the valve element of the opening/closing valve unit is supported by a diaphragm portion having an outer peripheral edge sandwiched between the opening/closing drive unit housing and the valve main body.

12. The suck-back valve according to claim 1, wherein the drive fluid in the second fluid chamber is supplied and discharged through a variable throttle valve with a check valve.

* * * * *